(12) United States Patent
Knierim et al.

(10) Patent No.: US 12,719,851 B2
(45) Date of Patent: Aug. 25, 2026

(54) METHOD FOR CARRYING OUT AN AUTHORIZATION PROCESS FOR A CLIENT APPLICATION

(71) Applicant: Siemens Aktiengesellschaft, Munich (DE)

(72) Inventors: Christian Knierim, Munich (DE); Angela Schattleitner, Tuntenhausen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 22 days.

(21) Appl. No.: 18/849,853

(22) PCT Filed: Mar. 3, 2023

(86) PCT No.: PCT/EP2023/055429
§ 371 (c)(1),
(2) Date: Sep. 23, 2024

(87) PCT Pub. No.: WO2023/186449
PCT Pub. Date: Oct. 5, 2023

(65) Prior Publication Data
US 2025/0211582 A1 Jun. 26, 2025

(51) Int. Cl.
*H04L 9/40* (2022.01)

(52) U.S. Cl.
CPC ................................ *H04L 63/0823* (2013.01)

(58) Field of Classification Search
CPC .................................................. H04L 63/0823
(Continued)

(56) References Cited

U.S. PATENT DOCUMENTS 6,807,181 B1 * 10/2004 Weschler ............ H04L 61/4552 713/182
8,966,568 B2 * 2/2015 Abendroth ............ H04L 63/104 726/4
(Continued)

FOREIGN PATENT DOCUMENTS

EP 1095493 A1 5/2001
WO 9965207 A1 12/1999

OTHER PUBLICATIONS

PCT International Search Report of the International Searching Authority mailed May 23, 2023 corresponding to PCT International Application No. PCT/EP2023/055429 filed Mar. 3, 2023.
(Continued)

*Primary Examiner* — Dant B Shaifer Harriman
(74) *Attorney, Agent, or Firm* — Schmeiser Olsen PLLC

(57) ABSTRACT

A method for carrying out an authorization process for a client application in a computer network system is provided, wherein an individual degree of confidence for the client application is generated by an authentication application, contact information relating to the client application is generated by the authentication application, and on the basis of the contact information and the degree of confidence access information of the client application is determined for an application program of the computer network system. Additionally, a method for running an application program, to the computer network system, to a computer program product, and to an electronically readable data carrier is provided.

15 Claims, 2 Drawing Sheets

(58) Field of Classification Search
USPC .............................................................. 726/4
See application file for complete search history.

(56) References Cited

U.S. PATENT DOCUMENTS

| | | | | |
|---|---|---|---|---|
| 9,154,488 | B2 * | 10/2015 | Innes | H04L 63/0823 |
| 9,842,220 | B1 * | 12/2017 | Brisebois | H04L 63/20 |
| 10,194,320 | B1 * | 1/2019 | Egner | H04W 12/61 |
| 11,700,252 | B2 * | 7/2023 | Koeten | H04L 63/0892 726/4 |
| 2003/0061517 | A1 * | 3/2003 | Mereu | H04L 63/0838 726/4 |
| 2004/0117615 | A1 * | 6/2004 | O'Donnell | H04L 63/0807 726/29 |
| 2004/0128499 | A1 * | 7/2004 | Peterka | H04L 63/0823 713/155 |
| 2011/0179477 | A1 * | 7/2011 | Starnes | H04L 63/0823 726/9 |
| 2018/0357439 | A1 * | 12/2018 | Osotio | G06F 21/6218 |
| 2019/0116156 | A1 * | 4/2019 | Glazemakers | H04L 63/08 |
| 2021/0037000 | A1 * | 2/2021 | Attard | H04W 12/06 |
| 2022/0144034 | A1 * | 5/2022 | Kim | H02K 7/102 |

OTHER PUBLICATIONS

Komarova, Maryna et al.:"Adjustable Trust Model for Access Control", 23. Jun. 2008, XP019090305, ISBN: 978-3-540-69294-2, pp. 429-443; 2008.

* cited by examiner 1
2
3
4
5
6
7
8
9
10
11
12
13
14
15
16
17
18
19
20

METHOD FOR CARRYING OUT AN AUTHORIZATION PROCESS FOR A CLIENT APPLICATION

CROSS-REFERENCE TO RELATED APPLICATIONS

This application is a national stage of PCT Application No. PCT/EP2023/055429, having a filing date of Mar. 3, 2023, which claims priority to EP application Ser. No. 22/164,989.0, having a filing date of Mar. 29, 2022, the entire contents both of which are hereby incorporated by reference.

FIELD OF TECHNOLOGY

The following relates to a method for performing an authorization process for a client application in a computer network system. The following likewise relates to a method for executing an application program. The following furthermore relates to a computer network system comprising at least one client application. The following furthermore relates to a computer program product and to an electronically readable data carrier.

BACKGROUND

In information technology, authorized access to systems, applications and/or networks is essential. Various security systems and/or security architectures are known for this purpose. By way of example, what is known as "zero-trust security" makes it possible to provide a security model in which no one is trusted automatically. In a "zero-trust model", each access operation to a network is checked multiple times, for example by mechanisms such as multi-factor authentication. This is used in particular for cyber security. The guiding principle of a "zero-trust architecture" is "trust no one, check everything". Innumerable applications and devices are thus able to be protected better.

Zero-trust data security is important since it offers a reliable cyber security framework for protecting against advanced attacks targeting complex IT environments with dynamic workloads in which changes of location and device often occur. Zero-trust architectures are also particularly expedient because multi-cloud and hybrid cloud deployments are becoming increasingly widespread and the number of externally exported applications used in companies is thus increasing.

In a zero-trust model, each individual identity in the network is checked with regard to its risk, wherein some activities are tracked precisely in real time. The cornerstone of this approach is the principle of least privilege access, meaning that each user is only granted as much access as they require to carry out the current task. Zero-trust frameworks never assume that an identity is trustworthy, and always require confirmation before access to the network is permitted. Zero-trust security is a software-defined model that is constantly being developed in order to protect applications and confidential data-independently of the user, device or location.

If, for example applications are protected with a zero-trust policy enforcement point (ZT-PEP), a respective trusted status of a client and of the user thereof are captured together with further threat and risk indicators. These attributes are combined suitably and calculated using a mathematical and/or logical formula to create a numerical value, what is known as the "trust score". This "trust score" may be transmitted to the application and evaluated by the application. If it is used to authorize access, access may be granted with the appropriate authorization, in particular on the basis of the trust score. In order to transmit the status, time-limited certificates or OAuth/JSON web tokens are usually created by the "authorization service" of the "policy enforcement point", containing the trust score and further information relevant to the application.

The requested application protected by the policy enforcement point may in this case assign access rights merely on the basis of the trust score but does not have any information whatsoever as to how this trust score is made up. A trust score is in this case made up of different parameter information in relation to the client. This includes for example the strengths of the authentication (one factor or two factors), the operating system of the client, the patch status of the device or the location of the device (for example secure network segment or direct connection from the Internet). The current global threat situation, known vulnerabilities of the communication protocol or heuristics, such as for example regarding quantity and regularity of the network traffic, may also be incorporated into the calculation of the trust score. As in the case of a hash function, the contribution of certain user parameters (which are critical for the authorization to access a resource) to the overall score that permits access via the network is no longer apparent or able to be worked out.

In the case of authorization on a service running on a server, the problem then arises that the service is able to use only the trust score for authorization, but does not independently assign granular access rights in relation to applications that are launched on the application as well and that are based on one or more aspects of the property determined by the zero-trust policy enforcement point, and is thus not able to change the priority thereof independently.

In the case of remote access operations, such as for example via secure shell or via remote desktop connections, only a check as to whether or not the application is permitted is carried out and, following successful logon, the authorizations assigned statically to the user account are used. In this case, the authorizations cannot be assigned dynamically within a session or during the use of a launchable application.

In the case of remote access solutions as provided for example by the company "CITRIX", it would be possible for access for the authenticated users to individual applications to be made possible on the associated CITRIX login portal by the zero-trust policy enforcement point depending on the score. However, as soon as a remote session is permitted, this is only able to be restricted by virtue of individual applications to be protected and called within the session likewise requesting authentication to a zero-trust policy enforcement point and the original context of the initial client is not, or not in its full scope, able to be authorized by the application during authorization.

What is known as SSH agent forwarding is also known in the case of remote access solutions, such as SSH. In this case, for logon on the first server, the SSH key for logon on downstream servers is used by virtue of the protocol supporting transitive access to the original authentication agent.

One disadvantage in the options mentioned is primarily that authorizations are assigned automatically during access.

SUMMARY

An aspect relates to more dynamically manage or adapt access or multiple access operations to one or more applications.

This aspect is achieved by multiple methods, a computer network system, a computer program product (non-transitory computer readable storage medium having instructions, which when executed by a processor, perform actions) and an electronically readable data carrier.

An aspect of embodiments of the invention relates to a method for performing an authorization process for a client application in a computer network system, wherein an individual degree of trust of the client application is generated using an authentication application, context information in relation to the client application is generated by the authentication application, wherein the context information is client-specific information that is able to characterize the client application, and access information for the client application for accessing an application program of the computer network system is determined on the basis of the context information and the degree of trust.

The proposed method is in particular a computer-implemented method. In embodiments, the method may in particular involve a cloud-based application.

The proposed method makes it possible to more dynamically manage access operations or access rights for a client or client application and the users thereof. Based on a wide variety of information provided, for example by the context information, it is thus possible to authorize, block or partially restrict a wide variety of access operations for the client application. Secure, controlled and adapted access is thus achieved.

Dynamic access for the client application to the application program may thus be authorized or permitted with the aid of the determined or generated access information. The access information may in particular be used to generate access rights for the client application. The proposed method in particular makes it possible to assign context-related access rights for applications and/or downstream applications in the zero-trust environment.

The proposed method makes it possible to achieve a situation whereby authorizations to a platform and/or a computer network system are able to be restricted on a session-related basis, including for applications that do not require network logon. In the case of logon, for example to services that are able to be reached via the network or computer network system, it is possible to take into consideration the context of the upstream systems or the application program alongside. Local server services, such as container runtime environments and local databases, are able to be restricted on a context-dependent basis on the computer network system or system. In the case of shell access operations, it is also possible to perform context-related application whitelisting. Using the access information, it is possible to deliver in particular more accurate context information to the application program or an application for authorizing the client application, which may then use the context information to grant access rights for the application program and/or further application programs and/or applications.

One exemplary application that may be mentioned here is that of remote access on an admin console via "secure shell" (SSH) to a server able to be reached from the Internet or a for example industrial controller. If, on the device, logon takes place based on the assigned trust score, that is to say the degree of trust, of the authorization server used by the policy enforcement point, a decision is made as to whether or not a user is allowed to log on using the user account. The permitted application or the application program (in this case for example a login shell) is then launched but does not use the context information any further but rather assigns it statically to the assigned account. The access rights of the shell are thus not able to be gradated on the basis of the trust score or the process authorization.

By way of example, the application program may be designed as a database or access at least one database. In this case, access to individual tables or columns in the database may be regulated or restricted, on the basis of the context information or logon context, with the aid of the access information depending on the context.

Using the access information, trust information, such as for example the degree of trust, which is assigned on a system, such as for example the computer network system, by a zero-trust policy enforcement point may be forwarded to applications running on another system.

This makes it possible, in the case of an industrial controller, not just to restrict the access authorizations of the admin console (shell access via SSH), but rather for example a logged-on user also receives gradated access to a docker runtime environment running thereon, for example depending on their location. One application case in this regard would be for example, in the case of a logon or login from an unsecured network, only access to the status of the containers or data containers is enabled and, in the case of access from a more secure network, the container instances running on the container runtime environment may also be launched and stopped.

The proposed method is particularly advantageous in the case of remote connections or remote applications. Cyber security or IT security may in particular be improved here.

A client application or a client, client-side application, client application or client program denotes a computer program that is executed on a terminal of a network, for example of a multi-network system and communicates with a server or central computer of the computer network system. The client application is in particular executed on a computing unit or a terminal by a user.

The authentication application may for example be referred to as an authentication service. This may in turn be implemented in a central computing unit of the computer network system. The individual degree of trust or degree of trustworthiness may be generated or created by way of the authentication application that is executed on a computing unit. The degree of trust may be the "trust score" already mentioned at the outset.

The context information makes it possible to provide further additional information. The context information thus delivers further information based on the degree of trust, such that it is possible to perform information enhancement. By way of example, the context information may be client-specific information that may be used to characterize the client application. By way of example, the access information may be determined or generated independently of the context information and the degree of trust by the authentication application and/or a computing unit. The degree of trust is thus linked to the context information. This may be used for subsequent access or to manage the access rights.

The computer network system may for example be referred to as a computer network. By way of example, the computer network system may have a central computer or main computer. Such a central computer is able to provide the connected computers (workspace computers or terminals) with the programs, services, system programs or application programs that run thereon.

In an exemplary embodiment of the present invention, provision is furthermore made for the client application to be executed on a terminal of the computer network system, wherein a property of the terminal and/or a property of the client application and/or user information in relation to a user of the client application and/or a property of a communication connection between the terminal and the computer network system is taken into consideration for generating the degree of trust. The properties and/or information just listed may in particular be used to generate the degree of trust or "trust score". This information and/or these properties may in particular be made available to the authentication application, for example the properties and/or information may be made available to the zero-trust policy enforcement point mentioned at the outset. This may in turn make this information available to the authentication application or transmit it thereto, such that an in each case individual degree of trust is able to be generated for a client application on the basis of a wide variety of information, properties and/or parameters. The degree of trust is a zero-trust score.

A wide variety of information and/or properties and/or threat indicators and/or risk indicators or a location of the terminal and/or a wide variety of parameter information may in particular be taken into consideration for generating the degree of trust. The strength of the authentication, an operating system of the terminal, the patch standard of the terminal, the location of the terminal, known vulnerabilities of protocols or heuristics of the communication connection and/or any other existing, in particular situation-dependent influencing factors may in particular be taken into consideration for calculating the degree of trust. Access information appropriate for the client application and in particular adapted to the situation may thus be generated later.

By way of example, the access information may be referred to as authentication information.

In addition, or instead, the context information may additionally be assigned to the authentication information queried by the zero-trust policy enforcement point in the authentication application and assigned to a request. By way of example, the degree of trust may be present as a certificate, signed OAuth token (token of an open authorization protocol) or a JSON web token (JavaScript object notation token).

In one exemplary embodiment, provision is made for access to the application program to be permitted on the basis of the access information, wherein access for the client application to at least one subroutine of the application program and/or at least one function of the application program is additionally permitted depending on the context information. It is thus possible to enable or provide context-dependent, in particular dynamic access to a wide variety of application programs and in particular applications for the client application. Based on the one-time generated access information, the client application may thus be allowed access to further sub-applications (subroutines) in addition to the main application (application program). Multiple access operations or access rights to a variety of functions and/or applications may thereby be provided to the client application through the one-time authorization process. It is thus possible to provide multiple context-dependent access operations to the client application and thus the user behind it efficiently and easily. In the case of the client application accessing a wide variety of programs or applications, it is thus not necessary to perform in each case an independent separate authorization process or access process. This is carried out with the aid of the generated access information upon a main access operation to the application program.

In other words, it is possible to provide the client application with various or different access rights or privileges to a wide variety of application programs and/or functions with the aid of the access information. In this case, individual access may furthermore be authorized or restricted for a respective application program and/or subroutine and/or function. By way of example, the client application may be provided with a more comprehensive access right or a larger degree of access operations on the access program than in the downstream or subordinate subroutines of the application program. It is thus possible to restrict security-critical and/or data protection-critical functions and/or subroutines with regard to the application program on a situation-dependent or specific basis.

In one exemplary embodiment, provision is furthermore made for a functional scope, an access right, a program scope, a number of access-authorized subroutines and/or functions, an application duration, read access and/or write access for the at least one subroutine and/or the at least one function of the application to be determined depending on the context information when accessing the application program. Access operations are thus allocated dynamically for the client application or the client. It is accordingly thus possible to provide an access model or access options tailored to the client based on a wide variety of context information. By virtue of the context information, it is possible to provide the client application with types of access or access scopes in relation to the at least one subroutine (or multiple subroutines) and/or the at least one function (may also be multiple functions) of the application program for example individually, on a situational basis and/or in a client-specific manner. Depending on which client application is involved and in particular which context information has been assigned to the client application, it is thus possible to tailor an application option with regard to the application program, the subroutines of the application program and/or the functions of the application program. Therefore, when the client application accesses the application program, access, the access scope and/or access authorization to all functions of the application program and all subroutines or subordinate programs and/or applications of the application program is established.

In one exemplary embodiment, provision is made for a guideline for the authentication application to be provided in a guideline database, wherein the individual degree of trust of the client application is generated using the authentication application depending on at least one trust criterion that is stored in the guideline. The degree of trust of the client application is able to be generated individually and, in a manner, adapted to the situation with the aid of the one or more guidelines and the one or more trust criteria stored therein, according to the application case and/or according to the circumstances or a respective situation.

The guideline may for example store specifications or rules that correspond in particular to the IT security of the computer network system. It may thus here already be established in advance what degree or what quality the IT security or security specifies for the computer system. This may already be taken into consideration in advance, such that each client application that wishes to authorize itself in the computer network system is able to be classified as accordingly security-relevant in advance.

The trust criterion may be used for example to provide a trust criterion for the client application, and this may be taken into consideration when generating the degree of trust.

The guideline and in particular the trust criterion stored in the guideline may be used to carry out in particular security-relevant weighting or assessment of the client application.

The guideline database is in particular for example, part of the computer network system. In one exemplary embodiment, provision is made for the degree of trust to be signed as a certificate by the authentication application, wherein this signed certificate is assigned to the client application. This makes it possible for example to assign a respective individual trust score or degree of trust unambiguously to the client application. This is advantageous in order to perform unambiguous authorization or an authorization process of the client application with regard to the application program. The application program may thus unambiguously identify the client application and take into consideration the degree of trust associated with the client application when determining the access information and thus the access.

Specifically, the degree of trust may also be generated and signed in other, in particular proprietary formats.

The signature in particular takes place only after the authenticity of the degree of trust has been checked, so that the generation of the degree of trust is not able to be manipulated.

By way of example, the degree of trust may be generated and signed as a certificate or as a token. The signed certificate thus makes it possible to achieve unambiguous assignment of the degree of trust or the trust score for the client application.

In one exemplary embodiment, provision is made for a session of the client application on the application program to be performed or launched depending on the determined access information, wherein respective current context information is established dynamically within this session and a dynamic allocation of access rights to the client application for accessing subroutines and/or functions of the application program is performed on the basis of the respectively determined current context information.

This has the advantage that, during a pre-existing or started session of the client application on the application program, the functional scope or the application options of the client application for accessing subroutines and/or functions of the application program are able to be changed or adapted dynamically. This thus achieves dynamic allocation or dynamic adaptation of the access rights of the client application, even during already granted access of the client application to the application program.

By way of example, context information may be made available again for this purpose or context information may be updated. It is thus possible, in an intelligent manner, to correct or to restrict or enhance access of the client application with regard to the application program and the functions or subroutines underneath it at any time. As a result, access operations for the client application may be restricted, in particular if it is established that the application program and in particular the computer network system is no longer completely secure, for example due to current circumstances.

A session is an existing connection of a client to a server or to the computer network system. At the start of such a session, a login, that is to say the authorization process, takes place, and a logout or logout process takes place at the end.

An application program should be understood to mean application software or a computer program.

In one exemplary embodiment, provision is furthermore made for a trustworthiness list containing context information values and degree of trust values to be provided, wherein access rights to the application program and/or further application programs are assigned in the client application using the trustworthiness list. Such a trustworthiness list makes it possible already to assign or allocate presets or predefined access rights to the client application. The client application may thus already be assigned a kind of basic access option or basic access rights. This may be taken into consideration in particular when generating or determining the access information.

Specific values with regard to the context information and values with regard to the degree of trust may in particular thus be predefined in a special list or table. This may be carried out for example by the authentication application.

By way of example, the trustworthiness list may be a list of exceptions (for example deny list or blacklist), a whitelist or an application whitelisting (for example allow list).

In one exemplary embodiment, provision is made for the access information to be encoded on the basis of an importance system. The authentication application may thus generate and provide a data-based form for the access information. This may be transmitted to the respective applications, systems and/or computer programs. The access information may in particular be implemented on the basis of a dual system, binary system, decimal system or hexadecimal system. Further known importance systems from information technology may also be applied.

By way of example, all attributes that were used and combined for authorization or authentication may be reconstructed with the aid of the importance system using a suitable mask. This is significant in the case of unambiguous and in particular security-critical authorization of the client application.

An aspect of embodiments of the invention relates to a method for executing an application program, in which a client application authorizes itself in accordance with a method according to one of the preceding aspects or an advantageous development thereof. The client application is permitted to access the application program in accordance with the access information. Embodiments of the previous aspect may in particular be considered to be embodiments of the present method.

Following the generation of the access information, an access process or authorization process of the client application may in particular be performed on the application program. To this end, the access information is analyzed and assessed accordingly by the application program, such that corresponding access and in particular corresponding access rights are able to be authorized or restricted for the client application.

In one exemplary embodiment of the further aspect, provision is made for the access information to additionally be provided with at least one attribute and stored in an attribute database of the application program. This is carried out in particular during the access process or during a logon process or login process of the client application on the application program. By way of example, when generating the access information, at least one additional attribute or multiple attributes may be added to the access information. When access is permitted for the client application to the application program, the at least one attribute may be stored or buffer-stored automatically in the attribute database. The at least one attribute may in particular be used for the dynamic assignment of access rights during the already permitted access to the application program.

In one exemplary embodiment of the further aspect, provision is made for special access for the client application to a subroutine and/or a function of the application program to be determined depending on the stored attribute. Downstream functions and/or subordinate subroutines of the application program are thus able to be restricted or authorized without special separate access for the use of the client application.

The stored attribute may in particular be used in a current session, that is to say on a session-related basis, of the client application with regard to the application program. In another access process or when starting a new or a further session, the stored attribute is in particular no longer able to be used. This may be used in particular in the case of permitted access and thus in the case of a started session of the application program.

An aspect of embodiments of the invention relates to a computer network system comprising a client unit for executing a client application and a server unit for executing an authentication application and an authentication program. The computer network system is designed to carry out a method according to one of the preceding aspects or an embodiment of at least one of the aspects.

A method according to the abovementioned aspects or an advantageous development of one of these aspects is in particular performed or carried out.

The computer network system may be a computing network or computer network. By way of example, the computer network system may be an industrial system, such as a production line, processing process, assembly line installation, manufacturing devices or a company network.

The client unit is in particular a computing unit. The server unit is for example a local, central or decentralized server. The server unit may in particular be a cloud-based unit.

The computer network system may likewise be a cloud-based system.

An aspect of embodiments of the invention relates to a computer program product able to be loaded directly into a memory of a controller of a computer network system according to the preceding aspect, comprising program means for carrying out embodiments of the method according to one of the preceding aspects or an advantageous development thereof when the program is executed in a controller of a computer network system.

An aspect of embodiments of the invention relates to an electronically readable data carrier with electronically readable control information stored thereon, the control information being designed, when the data carrier is used in a controller of a computer network system according to one of the preceding aspects, such that it performs a method according to one of the preceding aspects or an advantageous development thereof. By way of example, the computer network system may involve a cloud-based technology.

Exemplary embodiments of one aspect should be considered to be exemplary embodiments of the other aspects and vice versa.

Embodiments of the method should be considered to be embodiments of the further method, of the computer network system, of the computer program product and of the electronically readable data carrier. The computer network system, the computer program product and the electronically readable data carrier have physical features that make it possible to perform one of the methods or an embodiment thereof.

A computing unit, such as for example a client unit, a terminal or a server unit, may be understood in particular to mean a data processing device containing a processing circuit. The computing unit may thus in particular process data in order to perform computing operations. This may also include operations for performing indexed access operations to a data structure, for example a lookup table (LUT).

The computing unit may in particular contain one or more computers, one or more microcontrollers and/or one or more integrated circuits, for example one or more application-specific integrated circuits (ASIC), one or more field-programmable gate arrays, FPGA, and/or one or more systems on a chip, SoC. The computing unit may also contain one or more processors, for example one or more microprocessors, one or more central processing units, CPU, one or more graphics processing units, GPU, and/or one or more signal processors, in particular one or more digital signal processors, DSP. The computing unit may also contain a physical or virtual group of computers or other ones of the units.

In various exemplary embodiments, the computing unit contains one or more hardware and/or software interfaces and/or one or more memory units. A memory unit may be designed as a volatile data memory, for example as a dynamic random access memory, DRAM, or a static random access memory, SRAM, or as a non-volatile data memory, for example as a read-only memory, ROM, as a programmable read-only memory, PROM, as an erasable programmable read-only memory, EPROM, as an electrically erasable programmable read-only memory, EEPROM, as a flash memory or flash EEPROM, as a ferroelectric random access memory, FRAM, as a magnetoresistive random access memory, MRAM, or as a phase-change random access memory, PCRAM.

Unless indicated otherwise, all of the steps of the in particular computer-implemented method may be performed by at least one computing unit, which may also be referred to as a data processing device. The data processing device, which comprises at least one processing circuit that is designed or adapted to perform an in particular computer-implemented method according to embodiments of the invention, may in particular perform the steps of the computer-implemented method. To this end, the data processing device may in particular store a computer program comprising instructions that, when executed by the data processing device, in particular the at least one processing circuit, prompt the data processing device to carry out the computer-implemented method.

For application cases or application situations that may arise in embodiments of the method and that are not described explicitly here, provision may be made, according to embodiments of the method, for an error message and/or a request to enter user feedback to be output and/or a standard setting and/or a predetermined initial state to be set.

The features and combinations of features mentioned above in the description and the features and combinations of features mentioned below in the description of the figures and/or shown on their own in the figures may be used not only in the respectively indicated combination, but also in other combinations without departing from the scope of embodiments of the invention.

BRIEF DESCRIPTION

Some of the embodiments will be described in detail, with reference to the following figures, wherein like designations denote like members, wherein.

DETAILED DESCRIPTION

Figure 1:
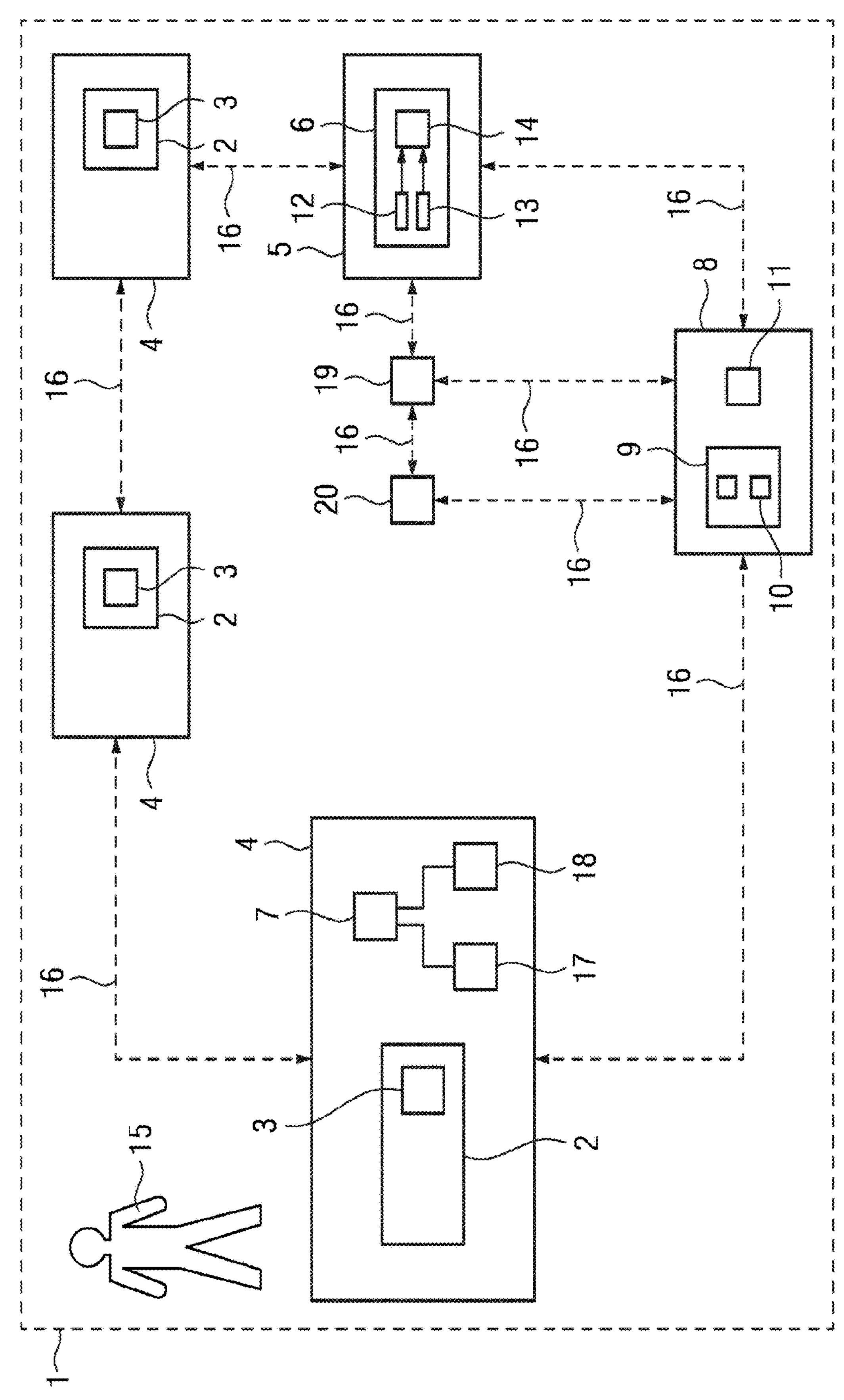
FIG. 1 shows a schematic illustration of a computer network system.

FIG. 1 shows an exemplary view of a computer network system 1. The computer network system 1, which is for example a computing network or a data processing network, may contain at least one client unit 2 for executing a client application 3. By way of example, the client unit 2 may be used to execute multiple client applications 3. By way of example, the client application 3 and/or the client unit 2 may be executed and in particular implemented on a terminal 4 of the computer network system 1. In one possible variant, the client unit 2 and the terminal 4 may be referred to as a unit. It is likewise conceivable for separate units to be involved.

The computer network system 1 may furthermore contain multiple client units 2 and in particular terminals 4. By way of example, the terminal 4 may be a computing unit. By way of example, the computer network system 1 may contain multiple computing units that may be networked with one another in terms of communication. The computer network system 1 may furthermore contain at least one server unit 5. The server unit 5, which is for example a computing apparatus, computing unit or cloud-based unit, may be used to execute an authentication application 6 and an application program 7. The server unit 5, which may be considered for example as a central computer or a central computing unit of the system 1, may in particular be used to execute application programs, applications or other software-based systems.

The computer network system 1 may furthermore contain a controller 8. This controller 8 may in turn have a memory 9 on which for example a computer program, also referred to below as a computer program product, 10 is able to be loaded. By way of example, the computer program product 10 may have program means in order to carry out one of the methods according to embodiments of the invention or a development thereof when the program 10 is executed in the controller 8 of the computer network system 1. Provision may furthermore be made for an electronically readable data carrier 11 containing stored electronically readable control information that is designed such that, when the data carrier 11 is used in the controller 8 of the computer network system 1, it optionally carries out a method according to embodiments of the invention.

By way of example, the client application 3 may perform an authorization process in the computer network system 1. For this purpose, an individual degree of trust 12 of the client application 3 may be generated or created using the authentication application 6. Context information 13 in relation to the client application 3 may additionally be generated by the authentication application 6. Access information 14 for the client application 3 for accessing the application program 7 may be determined on the basis of the context information 13 and the degree of trust 12. With the aid of the access information 14, the client application 3 is able to access the application program 7. An authorization process for the client application 3 for accessing the application program 7 is thus performed by determining the access information 14.

By way of example, a property of the terminal 4 and/or of the client unit 2 and/or a property of the client application 3 and/or user information in relation to a user 15 of the client application 3 and/or a property of a communication connection 16 between the terminal 4 and the system 1 may be made available or transmitted to the authentication application 6, such that at least one of these items of information or properties is able to be taken into consideration and thus used for generating the degree of trust 12. The communication connection 16 may for example be any communication connection or data transmission connection within the computer network system 1.

Access to the application program 7 may furthermore be permitted on the basis of the access information 14. In this case, access for the client application 3 to at least one subroutine 17 of the application program 7 and/or at least one function 18 of the application program 7 may be additionally permitted depending on the context information 13. Furthermore, by way of example, a functional scope, an access right, a program scope, a number of access-authorized subroutines and/or functions, an application duration, read access and/or write access for the at least one subroutine 17 and/or the at least one function 18 of the application program 7 may be determined by the authorization application 6 and/or the server unit 5 depending on the context information 13 when accessing the application program 7.

The system 1 may furthermore contain or include a guideline database 19. This may provide special guidelines and/or rules and/or prescriptions and/or specifications for the generation of the degree of trust 12. To this end, at least one guideline for the authentication application 6 may be provided in the guideline database 19 and the individual degree of trust 12 may be generated depending on at least one trust criterion stored in the guideline.

The authentication application 6 may furthermore be designed to generate a signed certificate on the basis of the degree of trust 12, such that this signed certificate may be used to perform unambiguous assignment and in particular identification of the client application 3. In the event of successfully permitted access for the client application 3 to the application program 7, a session may be started or performed. Within this session, the client application 3 may execute or apply or use the application program 7, the at least one subroutine 17 and/or the at least one function 18 in accordance with the assigned access rights. In order to be able to perform an intelligent and in particular dynamically adapted security check, respective current context information may be established dynamically within the session. This may be carried out for example using the server unit 5. It is thus possible to achieve a dynamic allocation of access rights for the client application 3 to access subroutines 17 and/or functions 18 on the basis of the respectively established current context information.

Provision may furthermore be made for a trustworthiness list or list of exceptions or whitelist or application whitelist containing context information values and trust values with regard to the context information 13 and the degree of trust 12 to be provided, wherein the client application 3 may already be assigned certain or predefined access rights in advance.

The server unit 5 may for example generate the access information 14 such that it is encoded on the basis of an importance system. This may be used better for further data processing.

By way of example, at least one attribute may be added to the access information 14 in addition to the context information 13. When the client application 3 accesses the application program 7, this additional attribute may be stored or buffer-stored in an attribute database 20, which is for example part of the application program 7. In turn, this special attribute may in particular be used within the session to determine special access operations for the client application 3 to a subroutine 17 and/or a function 18 of the application program 7.

Figure 2:
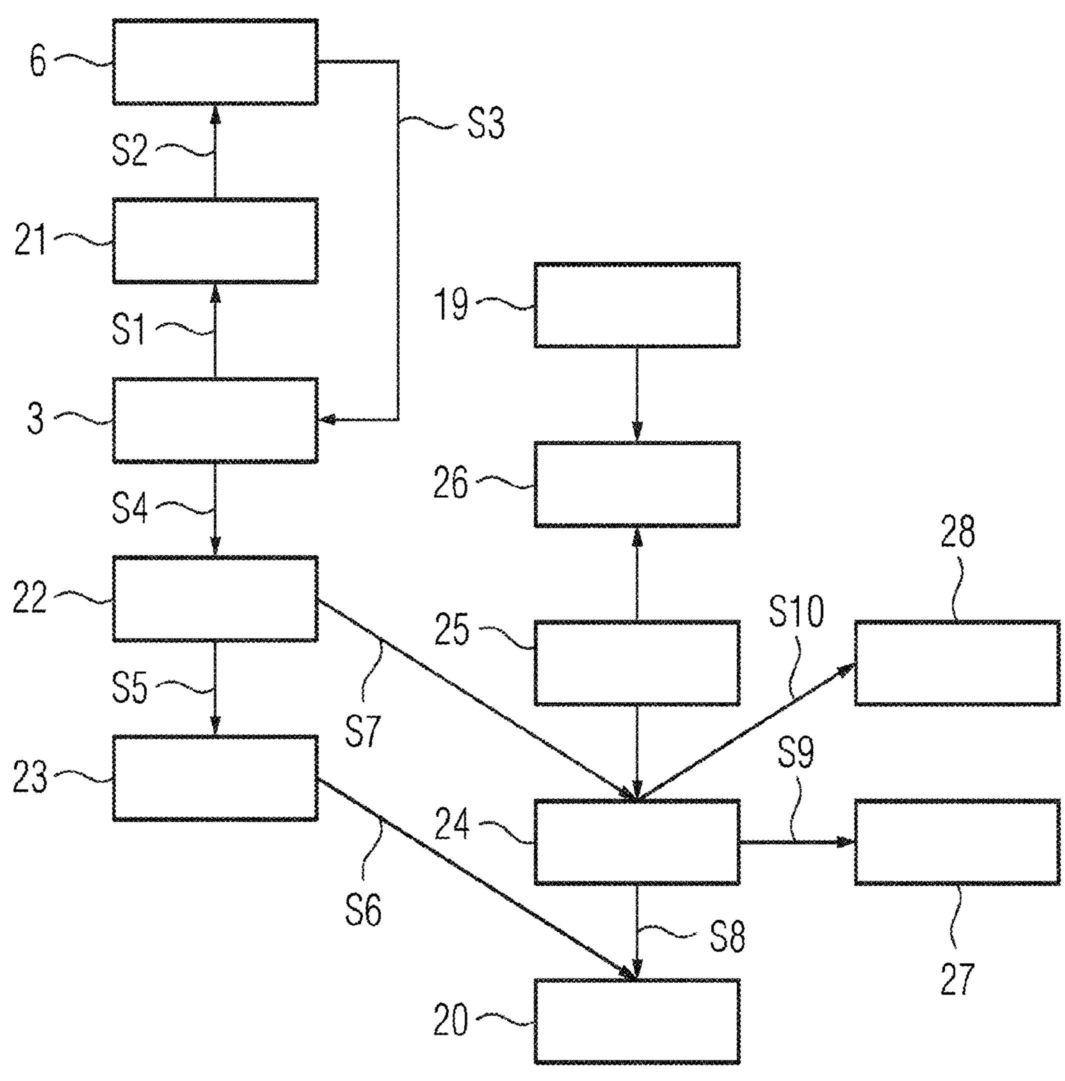
FIG. 2 shows a schematic sequence of one exemplary embodiment of a method.

An authorization process or a logon process by way of SSH (secure shell) is explained in FIG. 2 by way of example.

First of all, the client application 3 is authenticated at a zero-trust policy enforcement point 21. This may take place in an exemplary first step S1. In this case, the client application 3 may be assigned a special trust score (for example degree of trust 12). By way of example, in a subsequent second step S2, the trust score for forming a token or certificate may be transmitted to the authentication application 6 or authentication service. The authentication application 6 may in turn authenticate the client application 3. The zero-trust policy enforcement point 21, after determining the trust score (degree of trust 12), may query the guideline database 19. By way of example, the guideline database 19 may be referred to as a policy definition point. This may for example define or make available application-specific or application program-specific guidelines. In an optional third step S3, an authentication token containing context information may be created or generated. This in turn corresponds to the access information 14. Using this authentication token, which contains context information, the client application 3 is able to log onto an SSH daemon ("secure shell daemon") in an optional fourth step S4. This may for example be a terminal session via SSH.

The zero-trust policy enforcement point 21 may in particular additionally store client-specific information (context information 13) in the authentication information, which is queried by the authentication application 6 and assigned to the request and issued for example as a certificate or signed token, the client-specific information initially being sent back to the client application 3. This client-specific information may in this case be computed for example as independent meta-information, encrypted or computed using a fixed method (for example certain values at a defined position of the trust score), representing the overall score, that is to say the trust score.

Further attributes concerning the context of the request, or the global threat situation may likewise be included in authentication information. In one embodiment, the authentication information (access information 14) is encoded as an importance system, such that suitable masks may be used to reconstruct all attributes that were used and combined for authentication. The trust score has to be signed by the issuer, that is to say the authentication application 6.

The client application 3 may authenticate itself with the access information 14 on the application (application program 7) running on the resource server (terminal 4), which performs authorization of the access to a requested resource based on the properties stored in the token. As part of the logon process, the authentication information (access information 14) may be validated in this regard.

If the authorization, as for example in the case of a terminal session via SSH, is performed only in the logon process, the attributes delivered alongside the authentication information (additional attributes) are buffer-stored in a non-persistent secure attribute database (attribute database 20) running on embodiments of the system together with the underlying session ID (the session for the access authorization process). The session ID may in this case for example be defined by the process ID of the login process or be determined randomly. To this end, in an optional fifth step S5, the authorization may be performed with the token during the logon process. This may be carried out for example using an authentication module 23 ("pluggable authentication module system").

In an optional sixth step S6, it is possible in turn to capture the attributes with values per session and buffer-store them in the attribute database 20. The attribute database 20 is able to be accessed only with SSH access.

In an optional seventh step S7, after the logon process, a request may be made to launch the application of the application program 7. To this end, a login shell may for example be launched. To this end, for example, an authorization allocation component 24, which is for example part of the server unit 5, may be used. This may be implemented for example as an independent kernel module.

In an optional eighth step S8, the authorization allocation component 24 may in turn determine the session and the associated privileges with regard to the client application 3.

In a ninth step S9, session-related privileges with regard to the session may be determined. This may be achieved using loaded application guidelines 27.

In an optional tenth step S10, the program or the application program 7 may in turn be executed. A process launch 28 of the application program 7 thus takes place here. By way of example, a policy may additionally be made available to the authorization allocation component 24 based on a privilege loading program 25. This privilege loading program 25 may in turn be considered for determining restrictions for the application program 7 based on the guideline database 19 containing application guidelines 26.

The session ID may for example furthermore be defined by a process ID of the login process or determined randomly. During a login process (for example via SSH mode service), the process ID is known as soon as the login shell 22 is launched. In this case, a generic session ID is therefore first used, and the final process ID is assigned to the attribute database 20 only after the login shell has been launched (step S7). It is also necessary to ensure that only defined applications, such as for example the SSH server service, are able to access the attribute database 20. In the case of Linux systems, for example, access may be restricted to corresponding PAM modules (pluggable authentication modules 23), which are managed by the attribute database 20 as a non-volatile component. It is also possible for the database 20 to be operated on the system 1 using an independent server component, to which a stored application logs on using appropriate access data, for example via Unix domain socket.

By way of example, a new process (for example subroutine 17 or function 18), for example a login shell, may be launched within the session. This new process may be restricted using a variety of measures. In addition to the typical process privileges, such as permitted system calls or capabilities, in the exemplary application of a login shell, the execution of further operations may also be forbidden or permitted with the aid of further server services depending on the context.

With reference to the example of a Linux system, for example the solutions "sudo" or "fapolicyd" are used for this purpose. In order to be able to perform context-related restrictions for this purpose, it is possible, for each application or application program 7 on the system 1, to store information as to which restriction is to be implemented for which attribute type and which value. The guideline to be defined for this purpose may in this case be stored in a central "policy definition point" (guideline database 19). This may either be queried by the target system (system 1) on which the application (application program 7) is running, be distributed thereby to the target system (including secured using a signature integrity) or be stored locally on the respective system 1. The privileges or access rights or access to be granted are for this purpose determined for each attribute with the aid of an authorization allocation component 24 and the attribute database 20 on a session-related basis (that is to say for each individual session). The authorization allocation component 24 may be operated on the system 1 as an independent server process that manages the guideline in the user space and is informed by the kernel about the start of a new process with the aid of a dedicated kernel module or by "extended Berkeley packet filter programs" and the kernel waits until the privileges relevant for the session are communicated to it by the allocation component 24. As an alternative, the authorization allocation component 24 may be part of the kernel. In this case, this component is implemented for example as an independent module to which the policy, such as for example in the case of firewall rules, is communicated actively by a user space program when embodiments of the system is launched or in the event of a change.

If in turn further programs (subroutine 17 for example) are executed within the application program 7, in particular within a shell, the authorization allocation component 24 may determine attributes of the respective initial session. This may be determined for example by determining the login process or its ID within the process management of embodiments of the system. The privileges to be granted may be formed either by the agreed quantities across all attributes or be mapped onto the stored attributes via a best match policy, with these attributes possibly being able to be weighted accordingly. A score-based approach is furthermore also possible, wherein a corresponding score (degree of trust 12) is able to be determined on a system-specific or application-specific basis taking into consideration the application (application program 7) to be used.

A respective behavior may be defined in the guideline. In order possibly to be able to set up context-related services and "application whitelisting" in parallel with the session, provision may be made, in addition to the privileges assigned directly to the application program 7 (access information 14), for further applications (subroutines 17 and functions 18) for which further policies or guidelines are to be determined in parallel with the launching of the application program 7 and which are likewise to be set up in opposition to the launching of the application program 7 to be referenced as well.

If the session-related restrictions are determined (that is to say for the access rights for a session of the client application 3), the application program 7 may be launched. If further applications running alongside, such as for example subroutines for restricting the main application (application program 7), are executed, these must support the session-related implementation of restrictions by virtue of supporting for example session-related implementation of restrictions by performing for example session-related application whitelisting. Such a program may be executed in parallel with the initially launched application (application program 7) and implements restrictions, for example in the operating system core, by virtue of the restrictions applying only to the process ID of the application program 7. If local server services, such as a database, or access to container runtime environments is restricted, then these must be determined by the session of the client application 3 by virtue of the latter determining which process ID accesses the server service, for example with the aid of audit systems of the operating system or corresponding "extended Berkeley packet filter programs". The process ID may be assigned to a session by virtue of child processes also being able to be assigned to the superordinate restricted process via the process management of embodiments of the system. The server service may carry out a query in this regard. The server service may in this case query the attributes stored for the session from the attribute database 20 and applies same using embodiments of the method stored for the guideline (for example agreed quantities or first match) in order to determine the restrictions for the server component. After the restrictions have been determined, it is first checked whether the connection to the local server component is permitted and, if so, an application-related restriction may then be defined within the server component for the session. To this end, the access information 14 may again be taken into consideration.

If further application components not running on embodiments of the system are to be queried, for example via the network, provision may be made for either the client applications 3 themselves, which establish the request, to request a session-related authentication object from the local attribute database 20 or for an independent service on the server side to be able to request this from the client application 3. Authorization on a remote service then takes place in the same way as in the initial connection setup, but this no longer uses the authentication taboo issued by the zero-trust policy enforcement point 21. The session-based object (attribute) created and signed by the attribute database is used for authorization instead.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for performing an authorization process for a client application in a computer network system, the method comprising:

generating an individual degree of trust of the client application using an authentication application, wherein context information in relation to the client application is generated by the authentication application, and the context information is client-specific information that characterizes the client application; and determining access information for the client application for accessing an application program of the computer network system on a basis of the context information and the individual degree of trust.

2. The method as claimed in claim 1, wherein the client application is executed on a terminal of the computer network system, wherein a property of the terminal and/or a property of the client application and/or user information in relation to a user of the client application and/or a property of a communication connection between the terminal and the computer network system is taken into consideration for generating the individual degree of trust.

3. The method as claimed in claim 1, wherein access to the application program is permitted on a basis of the access information, wherein access for the client application to at least one subroutine of the application program and/or at least one function of the application program is additionally permitted depending on the context information.

4. The method as claimed in claim 3, wherein a functional scope, an access right, a program scope, a number of access-authorized subroutines and/or functions, an application duration, read access and/or write access for the at least one subroutine and/or the at least one function of the application program is determined depending on the context information when accessing the application program.

5. The method as claimed in claim 1, wherein a guideline for the authentication application is provided in a guideline database, wherein the individual degree of trust of the client application is generated using the authentication application depending on at least one trust criterion stored in the guideline.

6. The method as claimed in claim 1, wherein the individual degree of trust is signed as a certificate by the authentication application, wherein the certificate is assigned to the client application.

7. The method as claimed in claim 1, wherein a session of the client application on the application program is performed depending on the access information, wherein, within the session, respective current context information is established dynamically and dynamic allocation of access rights to the client application for accessing subroutines and/or functions of the application program is performed on a basis of the respectively established current context information.

8. The method as claimed in claim 1, wherein a trustworthiness list comprising context information values and degree of trust values is provided, wherein the client application is assigned access rights to the application program and/or further application programs using the trustworthiness list.

9. The method as claimed in claim 1, wherein the determined access information is encoded on a basis of an importance system.

10. A method for executing an application program, wherein a client application authorizes itself in accordance with a method as claimed in claim 1, and the client application is permitted to access the application program in accordance with the access information.

11. The method as claimed in claim 10, wherein the access information is additionally provided with at least one attribute and is stored in an attribute database of the application program.

12. The method as claimed in claim 11, wherein special access for the client application to a subroutine and/or a function of the application program is determined depending on the stored attribute.

13. A computer network system comprising:

a client unit for executing a client application; and a server unit for executing an authentication application and an application program, wherein the computer network system is configured to carry out a method as claimed in claim 1.

14. A computer program product, comprising a computer readable hardware storage device having computer readable program code stored therein, the program code executable by a processor of a computer network system to implement a method as claimed in claim 1.

15. A non-transitory electronically readable data carrier with electronically readable control information stored thereon, the control information being configured such that, when the data carrier is used in a controller of a computer network system, it performs a method as claimed in claim 1.

* * * * *